(12) United States Patent
Li et al.

(10) Patent No.: US 11,401,784 B2
(45) Date of Patent: Aug. 2, 2022

(54) IN-SITU HYDRAULIC JET EXPLOITING DEVICE AND METHOD OF LOW-PERMEABILITY NATURAL GAS HYDRATE RESERVOIR

(71) Applicant: GUANGZHOU INSTITUTE OF ENERGY CONVERSION, CHINESE ACADEMY OF SCIENCES, Guangzhou (CN)

(72) Inventors: Xiaosen Li, Guangzhou (CN); Pengfei Shen, Guangzhou (CN); Gang Li, Guangzhou (CN); Zhaoyang Chen, Guangzhou (CN); Yu Zhang, Guangzhou (CN); Yi Wang, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 342 days.

(21) Appl. No.: 16/648,261

(22) PCT Filed: Nov. 19, 2019

(86) PCT No.: PCT/CN2019/119404
§ 371 (c)(1),
(2) Date: Mar. 18, 2020

(87) PCT Pub. No.: WO2021/088124
PCT Pub. Date: May 14, 2021

(65) Prior Publication Data
US 2021/0404296 A1  Dec. 30, 2021

(30) Foreign Application Priority Data
Nov. 8, 2019 (CN) .......................... 201911090242.3

(51) Int. Cl.
E21B 41/00 (2006.01)
E21B 43/26 (2006.01)
G01N 15/08 (2006.01)

(52) U.S. Cl.
CPC ...... *E21B 41/0099* (2020.05); *E21B 41/0078* (2013.01); *E21B 43/26* (2013.01); *G01N 15/082* (2013.01); *G01N 15/0806* (2013.01)

(58) Field of Classification Search
CPC .. E21B 41/00; E21B 41/0078; E21B 41/0099; E21B 43/26; G01N 15/00; G01N 15/08; G01N 15/0806; G01N 15/082
See application file for complete search history.

(56) References Cited

U.S. PATENT DOCUMENTS 10,095,819 B2 * 10/2018 Li ........................... E21B 43/24
11,053,780 B2 *  7/2021 Chen ....................... E21B 47/07
(Continued)

FOREIGN PATENT DOCUMENTS

| CN | 101550816 A | 10/2009 |
|----|-------------|---------|
| CN | 101850223 A | 10/2010 |

(Continued)

*Primary Examiner* — Nguyen Q. Ha
(74) *Attorney, Agent, or Firm* — Bayramoglu Law Offices LLC

(57) ABSTRACT

An in-situ hydraulic jet exploiting device and method of a low-permeability natural gas hydrate reservoir. The device includes a high-pressure reaction kettle configured for formation, fracturing and exploiting of a hydrate, a stable-pressure gas supply module configured to adjust and control a gas flow rate, a constant-speed constant-pressure liquid supply module configured to control a liquid flow rate or keep liquid injection pressure constant, a thermostatic water bath configured to provide a constant-temperature environment for a device system, a back-pressure module configured to automatically control an exploiting rate or exploiting pressure, an in-situ hydraulic jet permeability enhancement (Continued)

module, a data collection and processing module configured to collect and process basic system parameters, and a pipeline connecting various components.

18 Claims, 4 Drawing Sheets

(56) References Cited

U.S. PATENT DOCUMENTS 11,085,862 B2 * 8/2021 Ye .......................... G01N 33/24
2005/0137094 A1 6/2005 Weaver et al.

FOREIGN PATENT DOCUMENTS

| CN | 103471976 | A | 12/2013 |
| CN | 204571851 | U | 8/2015 |
| CN | 107514256 | A | 12/2017 |
| CN | 208109793 | U | 11/2018 |
| CN | 109025985 | A | 12/2018 |
| CN | 109538170 | A | 3/2019 |

* cited by examiner

IN-SITU HYDRAULIC JET EXPLOITING DEVICE AND METHOD OF LOW-PERMEABILITY NATURAL GAS HYDRATE RESERVOIR

CROSS REFERENCES TO THE RELATED APPLICATIONS

This application is the national phase entry of International Application No. PCT/CN2019/119404, filed on Nov. 19, 2019, which is based upon and claims priority to Chinese Patent Application No. 201911090242.3, filed on Nov. 8, 2019, the entire contents of which are incorporated herein by reference.

TECHNICAL FIELD

The present invention relates to the technical field of natural gas hydrate development, and particularly, to an in-situ hydraulic jet exploiting device and method of a low-permeability natural gas hydrate reservoir.

BACKGROUND

Natural gas hydrates, also known as combustible ice, are ice-like white solid crystalline compounds, in which water and gas molecules are combined in an ice-like crystal lattice called a host under suitable pressure and temperature conditions. Hydrate-forming gases are usually small molecules and light molecules, such as $CH_4$, $C_2H_6$, and $CO_2$. These molecules and water may exist in the form of hydrates with structures I, II, and H, which depends on the type of gases and forming conditions. It has been found that natural gas hydrate deposits are concentrated in two distinct geological structures, i.e., deep-sea sediment and permafrost, where necessary high pressure and low temperature conditions exist. As a new type of potential energy source, due to huge reserves and widespread distribution, it is considered that the natural gas hydrates have far greater impact on the global economy than other unconventional natural gas. On Jul. 29, 2018, the offshore operation of the trial exploiting project of natural gas hydrates by a depressurization method in Shenhu area of the South China Sea, which was organized and implemented by China Geological Survey under the Ministry of Land and Resources, has been completed, which marks the successful conclusion of China's first trial exploiting of natural gas hydrates in sea areas. However, there exist the problems of low exploiting efficiency, high technical difficulty, high exploiting cost, environmental disasters and the like in exploiting of the natural gas hydrates. Therefore, the indoor simulation experimental study of natural gas hydrate exploiting technology is necessary. At present, in order to study different exploiting methods and exploiting technology characteristics of natural gas hydrate sediment in porous media, many research institutions and universities at home and abroad have developed many specific simulation experimental devices for exploiting natural gas hydrates.

In order to improve the exploiting efficiency of the natural gas hydrates, methods of increasing the depressurizing exploiting driving force, heating a hydrate sediment layer, and exploiting through multiple wells may be adopted. However, these methods do not effectively improve the current flowing status of gas and liquid in a natural gas hydrate decomposition process. The low permeability of the natural gas hydrate sediment results in a limited propagation distance of a depressurizing driving force and thus poorer fluidity of produced gas and liquid.

SUMMARY

The object of the present invention is to overcome defects of the prior art and provides an in-situ hydraulic jet exploiting device and method of a low-permeability natural gas hydrate reservoir. The device integrates an in-situ formation system of a low-permeability natural gas hydrate reservoir, an in-situ hydraulic jet permeability enhancement system and a constant-pressure exploiting system of a well group, may be configured to accurately study the formation, fracturing and exploiting characteristics of the natural gas hydrate sediment reservoir under nearly natural conditions and provide real and effective experimental data, guidance scheme and experimental basis for the exploiting of hydrate reservoirs in deep sea sediment and permafrost areas.

In order to achieve the above object, the present invention adopts the following technical solutions.

An in-situ hydraulic jet exploiting device of a low-permeability natural gas hydrate reservoir is provided. The device comprises:

a high-pressure reaction kettle configured for in-situ formation, in-situ hydraulic jet permeability enhancement and in-situ exploiting of natural gas hydrate sediment;

a stable-pressure gas supply module configured to inject natural gas into the high-pressure reaction kettle;

a constant-speed constant-pressure liquid supply module divided into two branches, one branch being configured to inject deionized water into the high-pressure reaction kettle and the other branch being configured to provide jet pressure for an in-situ hydraulic jet permeability enhancement module;

the in-situ hydraulic jet permeability enhancement module configured to perform hydraulic fracturing on the natural gas hydrate sediment in the high-pressure reaction kettle to improve the intrinsic permeability of the natural gas hydrate sediment;

a back-pressure module configured to control an exploiting rate or exploiting pressure of the natural gas hydrate sediment;

a thermostatic water bath configured to control the temperature in the process of formation, fracturing and exploiting of the natural gas hydrate sediment; and a data collection and processing module electrically connected to sensing elements of the high-pressure reaction kettle, the stable-pressure gas supply module, the constant-speed constant-pressure liquid supply module, the in-situ hydraulic jet permeability enhancement module, the back-pressure module and the thermostatic water bath so as to collect and process sensing signals of the various sensing elements.

As an improvement of the present invention, a plurality of horizontal exploiting wells is arranged inside the high-pressure reaction kettle, one end of the horizontal exploiting well is connected to the in-situ hydraulic jet permeability enhancement module, and the other end thereof is connected to the back-pressure module.

As an improvement of the present invention, the stable-pressure gas supply module comprises a high-pressure gas source, a pressure reducing valve, a high-pressure gas storage cylinder, and a gas flowmeter, wherein the high-pressure gas source is connected to an inlet of the high-pressure gas storage cylinder through the pressure reducing valve; a safety valve, a pressure sensor and a temperature sensor are mounted on the high-pressure gas storage cylinder; and an outlet of the high-pressure gas storage cylinder is connected to the high-pressure reaction kettle through the gas flowmeter.

The stable-pressure gas supply module may also accurately measure the amount of gas entering the high-pressure reaction kettle while controlling the rate of the natural gas entering the high-pressure reaction kettle.

As an improvement of the present invention, the constant-speed constant-pressure liquid supply module comprises a deionized water tank placed on an electronic balance, a constant-speed constant-pressure pump, a cooling coil and a floating piston cylinder, wherein the deionized water tank is divided into two branches through the constant-speed constant-pressure pump, one branch is connected to the high-pressure reaction kettle through the cooling coil and the other branch is connected to an upper end of the floating piston cylinder.

The constant-speed constant-pressure liquid supply module may accurately control the deionized water entering the high-pressure reaction kettle, and provide the jet pressure for the in-situ hydraulic jet permeability enhancement module.

As an improvement of the present invention, the in-situ hydraulic jet permeability enhancement module comprises a pulping pond placed on an electronic balance, a constant-speed constant-pressure pump, a one-way valve, the floating piston cylinder and a pulse abrasive nozzle, wherein the pulping pond is connected to a lower end of the floating piston cylinder through the constant-speed constant-pressure pump and the one-way valve; and the lower end of the floating piston cylinder is further connected to the horizontal exploiting well in the high-pressure reaction kettle through the pulse abrasive nozzle.

Abrasive slurry in the in-situ hydraulic jet permeability enhancement module enters the lower end of the floating piston cylinder through the constant-speed constant-pressure pump and the one-way valve from the pulping pond. The abrasive slurry at the lower end of the floating piston cylinder enters the pulse abrasive nozzle through the control valve under hydraulic pressure of the upper end, generates pulse oscillation in the pulse abrasive nozzle and is ejected from an upper end nozzle to form a pulse abrasive jet for performing hydraulic fracturing on the natural gas hydrate sediment formed in the high-pressure reaction kettle, thereby improving the intrinsic permeability of the natural gas hydrate sediment.

Further, the in-situ hydraulic jet permeability enhancement module further includes an overflow valve having one end connected a connection pipeline between the floating piston cylinder and the pulse abrasive nozzle, and the other end connected to the pulping pond.

In terms of the overflow valve, on the one hand, when the pressure at the lower end of the floating piston cylinder exceeds set pressure, the excessive abrasive slurry may automatically return to the pulping pond from the overflow valve; and on the other hand, when jet permeability enhancement ends, a part of ejected liquid in the high-pressure reaction kettle may return to the pulping pond through the overflow valve.

As an improvement of the present invention, the pulse abrasive nozzle comprises an impinging wall, an upper end of the impinging wall is of a conical structure with an upper end nozzle, and a lower end nozzle is arranged at a lower end of the impinging wall; an oscillation chamber is formed between the lower end nozzle and the upper end nozzle, and after entering the oscillation chamber from the lower end nozzle, the abrasive slurry generates pulse oscillation in the oscillation chamber, and is ejected from the upper end nozzle.

As an improvement of the present invention, the back-pressure module comprises a hydraulic oil tank, a hand pump, a back-pressure container, a back-pressure reaction kettle, a water storage tank placed on an electronic balance, a gas-liquid separator, a gas flowmeter and an exhaust gas tank, wherein the hydraulic oil tank is connected to a pressure control end of the back-pressure reaction kettle through the hand pump and the back-pressure container; an inlet of the back-pressure reaction kettle is connected to the horizontal exploiting well in the high-pressure reaction kettle; an outlet of the back-pressure reaction kettle is connected to an inlet of the gas-liquid separator; a liquid outlet of the gas-liquid separator is connected to the water storage tank; and a gas outlet of the gas-liquid separator is connected to the exhaust gas tank through the gas flowmeter.

Hydraulic oil in the back-pressure module enters the back-pressure container through the hand pump to reach set back pressure, and acts on the back-pressure reaction kettle, thereby accurately controlling the pressure of a gas-liquid mixture exploited from the horizontal exploiting well of the high-pressure reaction kettle and ensuring the stability of the exploiting process.

As an improvement of the present invention, a plurality of detection layers is arranged in the high-pressure reaction kettle along a vertical direction, a plurality of temperature sensors is uniformly arranged on each detection layer, and the plurality of temperature sensors on the same straight line along the vertical direction is encapsulated with one stainless steel sleeve.

An in-situ hydraulic jet exploiting method of a low-permeability natural gas hydrate reservoir is provided. The method is implemented based on the above device and comprises the following steps:

step I: filling porous sediment into the high-pressure reaction kettle, placing the high-pressure reaction kettle into the thermostatic water bath after sealing, and vacuumizing the high-pressure reaction kettle;

step II: injecting natural gas into the high-pressure reaction kettle through the stable-pressure gas supply module and injecting deionized water into the high-pressure reaction kettle through the constant-speed constant-pressure liquid supply module to form natural gas hydrate sediment;

step III: making abrasive slurry in the pulping pond enter the lower end of the floating piston cylinder through the constant-speed constant-pressure pump and making the deionized water enter the upper end of the floating piston cylinder through constant-speed constant-pressure pump, and when the pressure at the upper end of the floating piston cylinder reaches set jet pressure, opening the corresponding control valve for performing hydraulic jet permeability enhancement on the natural gas hydrate sediment through the pulse abrasive nozzle; and step IV, making the hydraulic oil return to the back-pressure container through the hand pump to increase the pressure of the back-pressure container to the exploiting pressure, opening the corresponding control valve for exploiting, making the exploited gas-liquid mixture enter the gas-liquid separator after the exploited gas-liquid mixture is buffered through the back-pressure reaction kettle, and recording the amounts of produced gas and liquid by the data collection and processing module in real time.

Compared with the prior art, the present invention has the advantages as follows.

1. A uniform high-saturation natural gas hydrate sediment system consistent with that under natural conditions may be prepared, and the formation process and characteristics of the hydrate under natural conditions are really reflected.

2. Hydraulic jet fracturing and permeability enhancement may be performed on the low-permeability natural gas hydrate sediment partially or entirely to study fracturing and damage effects of the hydraulic jet on the sediment.

3. The device system may be configured to perform exploiting automatically at constant pressure and constant flow, and study decomposition characteristics and gas-production liquid-production rules of the hydrate in constant-pressure exploiting and depressurizing exploiting processes.

Meanings of reference signs in the figures: 1: high-pressure gas source; 2: pressure reducing valve; 3: control valve; 4: pressure sensor; 5: safety valve; 6: temperature sensor; 7: high-pressure gas storage cylinder; 8: gas flowmeter; 9: electronic balance; 10: deionized water tank; 11: constant-speed constant-pressure pump; 12: pulping pond; 13: one-way valve; 14: floating piston cylinder; 15: overflow valve; 16: cooling coil; 17: high-pressure reaction kettle; 171: kettle body; 172: kettle cover; 173: warm-compaction hole; 174: sealing hoop; 175: limiting screw; 176: hydraulic jet hole; 18: pulse abrasive nozzle; 181; impinging wall; 182: upper end nozzle; 183: lower end nozzle; 184: oscillation chamber; 19: porous sediment; 20: horizontal exploiting well; 21: hydraulic oil tank; 22: hand pump; 23: back-pressure container; 24: back-pressure reaction kettle; 25: gas-liquid separator; 26: thermostatic water bath; 27: exhaust gas tank; 28: data communication interface; 29: data processing workstation; 30: liquid crystal display; 31: water storage tank; and 32: abrasive slurry.

DETAILED DESCRIPTION OF THE EMBODIMENTS

In order to make the above object, features and advantages of the present invention more apparent and understandable, the present invention will be further explained in detail below with reference to the accompanying drawings and embodiments.

Figure 1:
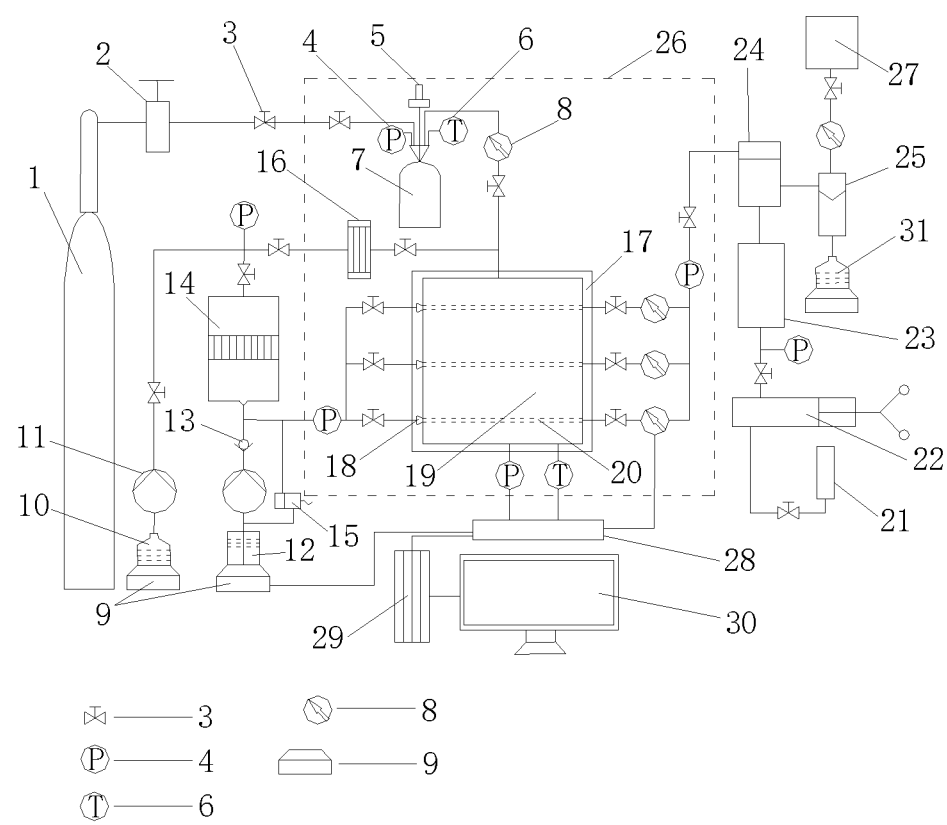
FIG. 1 is a structural diagram of an embodiment of the present invention.

As shown in FIG. 1, an in-situ hydraulic jet exploiting device of a low-permeability natural gas hydrate reservoir includes a high-pressure reaction kettle 17 configured for in-situ formation, fracturing and exploiting of natural gas hydrate sediment, a stable-pressure gas supply module configured to adjust and control a gas flow rate, a constant-speed constant-pressure liquid supply module configured to control a liquid flow rate or keep liquid injection pressure constant, a thermostatic water bath 26 configured to provide a constant-temperature environment for a device system, a back-pressure module configured to automatically control an exploiting rate or exploiting pressure, an in-situ hydraulic jet permeability enhancement module configured to perform hydraulic fracturing on the natural gas hydrate sediment to improve the intrinsic permeability of the natural gas hydrate sediment, a data collection and processing module configured to collect and process basic system parameters, pipelines connecting various components, valves and control system.

The stable-pressure gas supply module, the constant-speed constant-pressure liquid supply module, the back-pressure module, the in-situ hydraulic jet permeability enhancement module and the data collection and processing module are connected to the high-pressure reaction kettle 17 respectively. The data collection and processing module is electrically connected to the stable-pressure gas supply module, the constant-speed constant-pressure liquid supply module, the thermostatic water bath 26, the back-pressure module and the in-situ hydraulic jet permeability enhancement module respectively.

The device is innovative in that the device may be configured to prepare uniform high-saturation natural gas hydrate sediment system consistent with that under natural conditions, and perform in-situ hydraulic jet fracturing and permeability enhancement, and exploiting at the constant pressure and constant flow.

Figure 2:
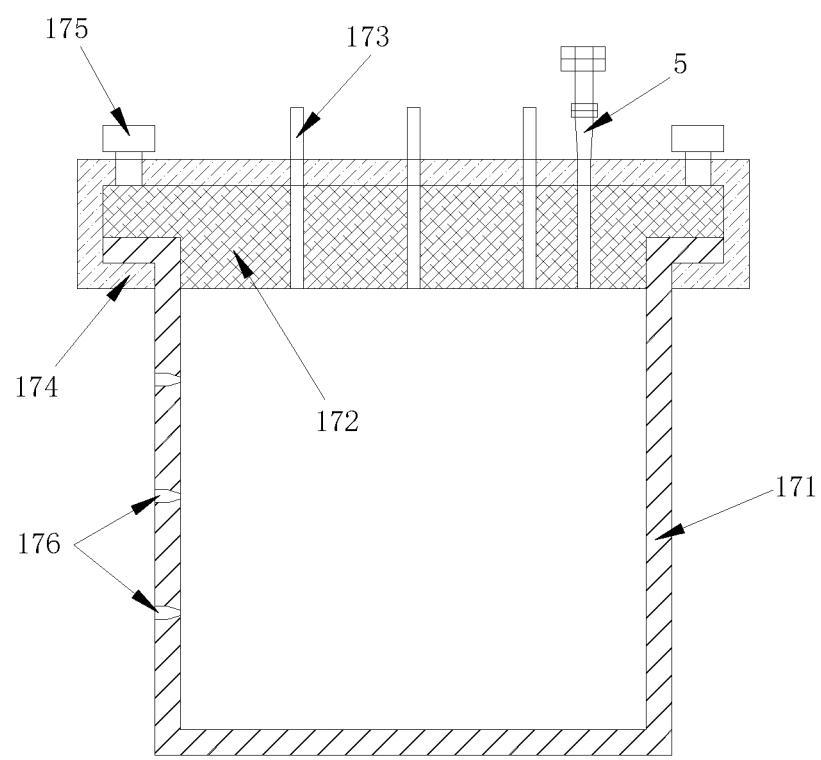
FIG. 2 is a structural diagram of a high-pressure reaction kettle of an embodiment of the present invention.
Figure 4:
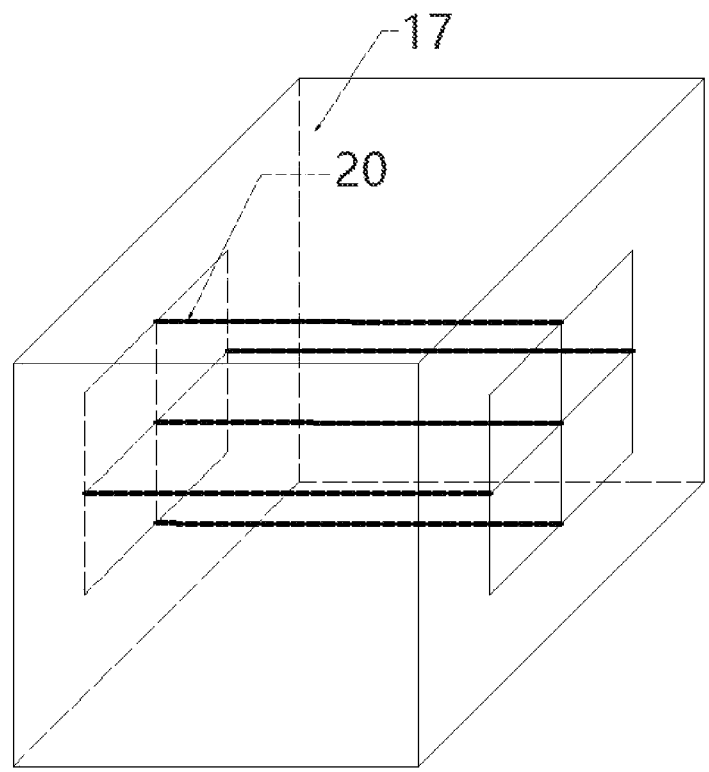
FIG. 4 is a structural diagram for arrangement of horizontal exploiting wells in the high-pressure reaction kettle of the embodiment of the present invention.

FIGS. 2 and 4 show the structure of the high-pressure reaction kettle 17. The high-pressure reaction kettle 17 mainly comprises a kettle body 171 with an open upper end and a kettle cover 172 covering the kettle body 171. The kettle body 171 and the kettle cover 172 adopt a quick-opening structure. For example, the kettle cover 172 hoops the kettle body 171 through a sealing hoop 174 and is fixed through a limiting screw 175 penetrating through the sealing hoop 174 and the kettle cover 172. A warm-compaction hole 173 is formed in the kettle cover 172 for allowing a stainless steel sleeve to pass through. A safety valve 5 is further arranged on the kettle cover 172. A hydraulic jet hole 176 is formed in a side wall of the kettle body 171 for mounting of a pulse abrasive nozzle 18. The positions and number of the hydraulic jet holes are determined according to experimental requirements, and correspond to those of horizontal exploiting wells 20 in this embodiment.

Figure 3:
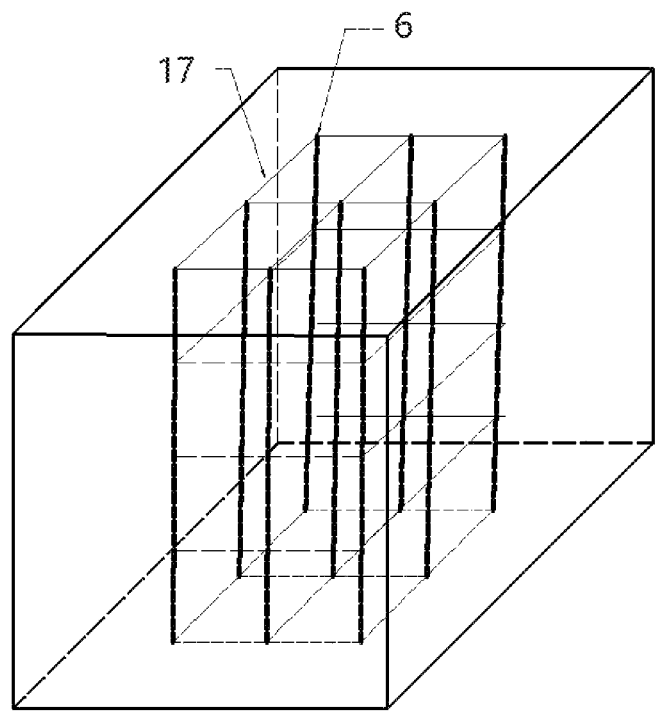
FIG. 3 is a structural diagram for distribution of temperature sensors in the high-pressure reaction kettle of the embodiment of the present invention.

A plurality of detection layers is arranged in the high-pressure reaction kettle 17 along a vertical direction. In this embodiment, three detection layers are arranged and respectively are, as shown in FIG. 3, an upper detection layer, a middle detection layer and a lower detection layer which correspond to the interior of the natural gas hydrate sediment. The three detection layers divide an inner chamber of the high-pressure reaction kettle 17 into four equal parts. A plurality of temperature sensors 6 is uniformly arranged on each detection layer. In this embodiment, 9 temperature sensors are arranged on each detection layer. Optionally, pressure sensor 4 may also be arranged on each detection layer. The upper, middle and lower temperature sensors 6 on the same straight line are encapsulated with one stainless steel sleeve and are not in contact with the natural gas hydrate sediment in the high-pressure reaction kettle 17.

The stable-pressure gas supply module is configured to inject natural gas into the high-pressure reaction kettle 17 and mainly comprises a high-pressure gas source 1 and a high-pressure gas storage cylinder 7 connected to the high-pressure gas source 1. A pressure reducing valve 2 and a control valve 3 are mounted on a pipeline between the high-pressure gas source 1 and the high-pressure gas storage cylinder 7. A safety valve 5, a pressure sensor 4 and a temperature sensor 6 are mounted on the high-pressure gas storage cylinder 7. The high-pressure gas storage cylinder 7 is connected to the high-pressure reaction kettle 17, and another control valve 3 and a gas flowmeter 8 are arranged on a connection pipeline between the high-pressure gas storage cylinder 7 and the high-pressure reaction kettle 17. A gas path is that the high-pressure gas source 1 enters the high-pressure gas storage cylinder 7 through the pressure reducing valve 2 and the control valve 3, and then enters the high-pressure reaction kettle 17 through the gas flowmeter 8 and the another control valve 3. The another control valve 3 and the gas flowmeter 8 may control the rate of gas entering the high-pressure reaction kettle 17 from the high-pressure storage cylinder 7 and accurately measure the amount of the gas entering the high-pressure reaction kettle 17.

The constant-speed constant-pressure liquid supply module mainly comprises a deionized water tank 10 placed on an electronic balance 9, a cooling coil 16, a floating piston cylinder 14 and a matching control valve 3. The deionized water tank 10 is connected to a constant-speed constant-pressure pump 11. The constant-speed constant-pressure pump 11 is connected to the cooling coil 16 and the floating piston cylinder respectively 14. The cooling coil 16 is connected to the high-pressure reaction kettle 17. A liquid path is that deionized water weighed by the electronic balance 9 in real time is divided into two branches after passing through the constant-speed constant-pressure pump 11, one branch of deionized water enters the high-pressure reaction kettle 17 through the cooling coil 16 for hydrate synthesis, and the other branch of deionized water enters an upper end of the floating piston cylinder 14 for providing jet pressure for the in-situ hydraulic jet permeability enhancement module.

The in-situ hydraulic jet permeability enhancement module mainly comprises a pulping pond 12 placed on an electronic balance 9, a constant-speed constant-pressure pump 11, a one-way valve 13, an overflow valve 15, a pulse abrasive nozzle 18, a matching pressure valve 4 and a matching control valve 3. The pulping pond 12 is connected to a lower end of the floating piston cylinder 14 through the constant-speed constant-pressure pump 11 and the one-way valve 13. A branch from a connection pipeline between the floating piston cylinder 14 and the one-way valve 13 is sequentially communicated with the pressure sensor 4 and the control valve 3 which are outside the high-pressure reaction kettle 17, and then is connected to the pulse abrasive nozzle 18. One end of the overflow valve 15 is connected to the connection pipeline between the floating piston cylinder 14 and the one-way valve 13, and the other end thereof is connected to the pulping pond 12. The pulse abrasive nozzle 18 is fixed to the side wall of the high-pressure reaction kettle 17 and communicated with the interior of the high-pressure reaction kettle 17. The number of the pulse abrasive nozzles 18 is set according to design requirements and preferably corresponds to that of horizontal exploiting wells 20 in the high-pressure reaction kettle 17. Each pulse abrasive nozzle 18 matches one control valve 3 for independent control.

Figure 5:
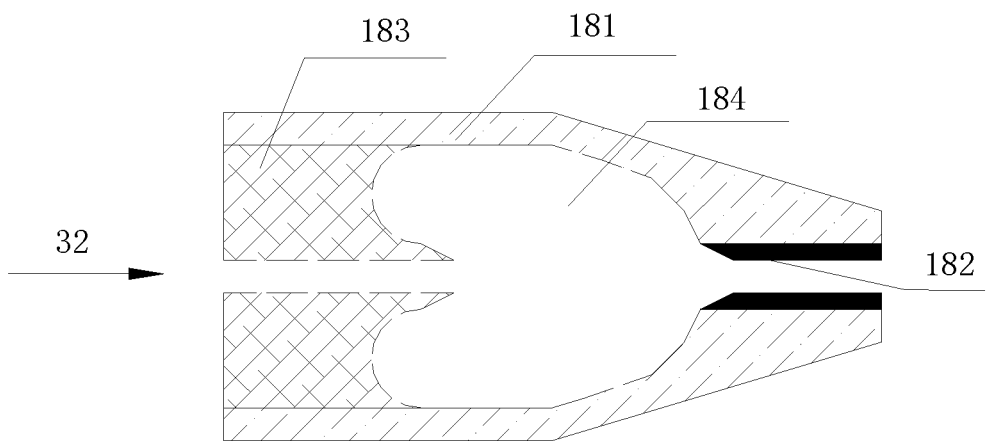
FIG. 5 is a structural diagram of a pulse abrasive nozzle of an embodiment of the present invention.

The specific structure of the pulse abrasive nozzle 18 is as shown in FIG. 5. The pulse abrasive nozzle 18 comprises an impinging wall 181. An upper end of the impinging wall 181 is of a conical structure with an upper end nozzle 182, and a lower end nozzle 183 is arranged at a lower end of the impinging wall 181. An oscillation chamber 184 is formed between the lower end nozzle 183 and the upper end nozzle 182. The oscillation chamber 184 recesses towards the lower end nozzle 183 to form an annular groove with the lower end nozzle 183 as a centre. The inner side of the annular groove and the lower end nozzle 183 form a cone with a jet hole. After entering the oscillation chamber 184 from the lower end nozzle 183, abrasive slurry 32 generates pulse oscillation in the oscillation chamber 184, and forms a pulse abrasive jet around the annular groove and the cone from the impinging wall 181 and the pulse abrasive jet is ejected through the upper end nozzle 182.

When the in-situ hydraulic jet permeability enhancement module operates, the abrasive slurry enters the lower end of the floating piston cylinder 14 through the constant-speed constant-pressure pump 11 and the one-way valve 13 from the pulping pond 12. When the pressure exceeds set pressure, excessive abrasive slurry automatically returns to the pulping pond from the overflow valve 15. The abrasive slurry at the lower end of the floating piston cylinder 14 enters the pulse abrasive nozzle 18 through the control valve 3 under hydraulic pressure at the upper end, generates pulse oscillation in the pulse abrasive nozzle 18 and is ejected from the upper end nozzle 182 to form the pulse abrasive jet for performing hydraulic fracturing on the natural gas hydrate sediment in the high-pressure reaction kettle 17, thereby improving the intrinsic permeability of the natural gas hydrate sediment.

The thermostatic water bath 26 is configured to control the temperature in the process of formation, fracturing and exploiting of the natural gas hydrate sediment in the high-pressure reaction kettle 17. In this embodiment, the high-pressure gas storage cylinder 7, the cooling coil 16, the high-pressure reaction kettle 17 and the pulse abrasive nozzle 18 are all placed in the thermostatic water bath 26. The thermostatic water bath 26 has a temperature control range of −20° C.-40° C. and control accuracy of ±0.1° C.

The back-pressure module is configured to control an exploiting rate or exploiting pressure of the natural gas hydrate sediment and mainly includes a hydraulic oil tank 21, a hand pump 22, a back-pressure container 23, a back-pressure reaction kettle 24, a water storage tank 31 placed on an electronic balance 9, a gas-liquid separator 25 connected to the water storage tank 31, a gas flowmeter 8 and an exhaust gas tank 27.

An inlet of the gas-liquid separator 25 is connected to the back-pressure reaction kettle 24. A liquid outlet of the gas-liquid separator 25 is connected to the water storage tank 31, and a gas outlet thereof is connected the exhaust gas tank 27 through the gas flowmeter 8. The hydraulic oil tank 21 for storing hydraulic oil is connected to the hand pump 22. The back-pressure container 23 is communicated with the hand pump 22 and the back-pressure reaction kettle 24. The back-pressure reaction kettle 24 is connected to the horizontal exploiting well 20 through the gas flowmeter 8 and the control valve 3 which are outside the high-pressure reaction kettle 17.

When the back-pressure module operates, the hydraulic oil in the hydraulic oil tank 21 is sucked into the back-pressure container 23 through the hand pump 22 to make the pressure reach set back pressure, and acts on the back-pressure reaction kettle 24, thereby accurately controlling the pressure of a gas-liquid mixture exploited from the horizontal exploiting well 20 of the high-pressure reaction kettle 17 and ensuring the stability of the exploiting process. The gas-liquid mixture enters the gas-liquid separator 25 through the back-pressure reaction kettle 24 for gas-liquid separation. The separated liquid is stored in the water storage tank 31 and weighed by the electronic balance 9 in real time, and the separated gas is recovered to the exhaust gas tank 27 and measured by the gas flowmeter 8 in real time.

The data collection and processing module includes a data communication interface 28, a data processing workstation 29 and a liquid crystal display 30. The data communication interface 28 is connected to all the pressure sensors 4, the temperature sensors 6, the gas flowmeters 8 and the electronic balances 9 of the device. Both the data communication interface 28 and the liquid crystal display 30 are connected to the data processing workstation 29.

The data collection and processing module may transmit data of all the pressure sensors 4, the temperature sensors 6, the gas flowmeters 8, the electronic balances 9 and the like in the system to the data processing workstation 29 through the data communication interface 28 and store the data in the data processing workstation 29, and the data is displayed on the liquid crystal display 30 after being processed by the data processing workstation 29.

The operation process of the in-situ hydraulic jet exploiting device of the low-permeability natural gas hydrate reservoir is explained below.

1. Porous sediment 19 is filled into the high-pressure reaction kettle 17. The pressure sensor 4 is mounted and three layers of temperature sensors 6 are arranged uniformly along the vertical direction. Nine temperature sensors 6 are arranged on each layer. The temperature sensors 6 are encapsulated by the stainless steel sleeves and are not in direct contact with the porous sediment 19. The pulse abrasive nozzles 18 and five horizontal exploiting wells 20 are connected respectively. The control valve 3, the gas flowmeter 8, the pressure sensor 4 and other experiment components which are outside the high-pressure reaction kettle 17 are sequentially connected. After assembly of the device, the modules which should be located in the thermostatic water bath 26 are sequentially placed in the thermostatic water bath 26, and the experimental temperature of the thermostatic water bath 26 is set. After the system temperature is stabilized, the high-pressure reaction kettle 17 is vacuumized.

2. The high-pressure gas source 1 enters the high-pressure gas storage cylinder 7 through the pressure reducing valve 2 and the control valve 3 safely at stable pressure. After the gas temperature of the high-pressure gas storage cylinder 7 is stabilized, the rate of gas entering the high-pressure reaction kettle 17 from the high-pressure gas storage cylinder 7 is controlled in real time according to a presented reading of the gas flowmeter 8, and a required amount of gas is accurately injected into the high-pressure reaction kettle 17 according to the experiment requirements. The deionized water passes through the cooling coil 16 at a constant speed through the matching constant-speed constant-pressure pump 11 and then enters the high-pressure reaction kettle 17. The volume of the liquid entering the high-pressure reaction kettle 17 is measured according to a presented reading of the high-precision electronic balance 9. When the pressure reaches set experimental pressure after the liquid is injected or when the amount of injected liquid reaches the amount of liquid required by the experiment, the matching constant-speed constant-pressure pump 11 stops operating, and the hydrate starts to form until the system pressure reaches the final pressure designed according to the experiment.

3. The abrasive slurry enters a lower end chamber of the floating piston cylinder 14 through the matching constant-speed constant-pressure pump 11 and the one-way valve 13 from the pulping pond 12, wherein the volume and pressure of the injected slurry should satisfy experimental requirements. The deionized water enters an upper end chamber of the floating piston cylinder 14 through the matching constant-speed constant-pressure pump 11 for providing jet pressure for the in-situ hydraulic jet permeability enhancement module. The abrasive slurry generates pulse oscillation in the pulse abrasive nozzle 18 after being subjected to jet pressure, and is ejected from the upper end nozzle 182 to form the pulse abrasive jet for performing hydraulic fracturing on the natural gas hydrate sediment which has been formed in the high-pressure reaction kettle 17, thereby improving the intrinsic permeability of the natural gas hydrate sediment. The natural gas hydrate sediment is fractured at many times according to the experimentally set fracturing degree to construct artificial fractures. When the pressure exceeds the set pressure, the excessive abrasive slurry automatically returns to pulping pond 12 from the overflow valve 15, and the operation of hydraulic jet fracturing and permeability enhancement ends.

4. The hand pump 22 is adjusted to inject the hydraulic oil in the hydraulic oil tank 21 into the back-pressure container 23 so as to make the pressure reach set exploiting pressure, and the control valve 3 at the outlet of the horizontal exploiting well 20 is adjusted according to the set exploiting pressure and exploiting flow. After being buffered through the back-pressure reaction kettle 24, the exploited gas-liquid mixture enters the gas-liquid separator 25 for gas-liquid separation. The separated liquid is stored in the water storage tank 31 and weighed by the electronic balance 9 in real time, and the separated gas is recovered to the exhaust gas tank 27 and measured by the gas flowmeter 8 in real time. The data collection and processing module may transmit data of all the pressure sensors 4, the temperature sensors 6, the gas flowmeters 8, the electronic balances 9 and the like in the system to the data processing workstation 29 through the data communication interface 28 and store the data in the data processing workstation 29, and the data is displayed on the liquid crystal display 30 after being processed by the data processing workstation 29. The experiment ends.

The present invention further provides an in-situ hydraulic jet exploiting method of a low-permeability natural gas hydrate reservoir. The method is implemented based on the above device and comprises the following steps.

In step I, porous sediment 19 is filled into the high-pressure reaction kettle 17, and the temperature sensors 6 are uniformly arranged at corresponding positions in the high-pressure reaction kettle 17. The pulse abrasive nozzle 18 is connected, and the high-pressure reaction kettle 17 is placed into the thermostatic water bath 26 after sealing, and then is vacuumized.

In step II, the porosity of the sediment in the high-pressure reaction kettle 17 is measured, and the finally required three-phase saturation of the hydrate, gas and liquid is designed according to the experiment. The volumes of the gas and a solution under the standard conditions, which are required to be injected before the formation of the hydrate is calculated reversely according to the actual gas state equation and the principle of mass conservation, and according to this calculation result, methane gas is injected into the high-pressure reaction kettle 17. The operating pressure and liquid injection rate of the constant-speed constant-pressure pump 11 are set. The deionized water 10 solution is injected into the high-pressure reaction kettle 17 through the cooling coil 16. After the pressure of the high-pressure reaction kettle 17 rises to set pressure, the constant-speed constant-pressure pump 11 automatically suspends liquid injection. When the system pressure is lower than the experimental design pressure due to hydrate formation, the constant-speed constant-pressure pump 11 automatically starts and continuously injects liquid into the high-pressure reaction kettle until the system pressure rises to the set pressure again or the accumulated amount of injected liquid reaches the required theoretical total solution amount. At this time, hydrate formation continues until the system pressure drops to target formation pressure. At this time, the hydrate formation process ends and the three-phase saturation of the system is consistent with the target value.

In step III, the abrasive in the pulping pond 12 enters the lower end of the floating piston cylinder 14 through the constant-speed constant-pressure pump 11 and the deionized water enters the upper end of the floating piston cylinder 14 through constant-speed constant-pressure pump 11. The jet pressure is provided by hydraulic pressure of the inner chamber at the upper end of the floating piston cylinder 14. When the pressure at the upper end of the floating piston cylinder 14 reaches set jet pressure, the constant-speed constant-pressure pump 11 keeps pressure constant. The rated flow for jet is set, the control valve 3 at the corresponding position is opened according to experimental requirements, and hydraulic jet permeability enhancement starts. After the jet permeability enhancement of a required experimental part, the pressure at the upper end of the floating piston cylinder 14 is reduced to the experimental design pressure. A part of ejected liquid in the high-pressure reaction kettle 17 returns to the pulping pond 12 through the overflow valve 15, the control valve 3 is closed after the pressure is stabilized, and hydraulic jet permeability enhancement ends.

In step IV, the hydraulic oil 21 returns to the back-pressure container 23 through the hand pump 22 to increase the pressure of the back-pressure container 23 to the exploiting pressure. According to set exploiting flow and different exploiting modes, the control valve 3 is opened for performing a exploiting experiment. After being buffered through the back-pressure reaction kettle 24, the exploited gas-liquid mixture enters the gas-liquid separator 25, the flow and volume of the produced gas and the quality of the produced liquid are recorded by the data collection and processing module in real time. The data is stored, and displayed on the liquid crystal display 30 in real time.

The above embodiments are merely for describing the technical concept and features of the present invention, their object is that those of ordinary skill in the art could understand the content of the present invention and implement therefrom, and limitation to the scope of protection of the present invention cannot be made only by these embodiments. All equivalent changes or modifications made in accordance with the spirit of the present invention should be within the scope of protection of the present invention.

What is claimed is:

1. An in-situ hydraulic jet exploiting device of a low-permeability natural gas hydrate reservoir, comprising:
a high-pressure reaction kettle configured for in-situ formation, in-situ hydraulic jet permeability enhancement and in-situ exploiting of a natural gas hydrate sediment;
a stable-pressure gas supply module configured to inject natural gas into the high-pressure reaction kettle;
a constant-speed constant-pressure liquid supply module divided into two branches, one branch of the two branches being configured to inject deionized water into the high-pressure reaction kettle and an other branch of the two branches being configured to provide jet pressure for an in-situ hydraulic jet permeability enhancement module;
the in-situ hydraulic jet permeability enhancement module configured to perform hydraulic fracturing on the natural gas hydrate sediment in the high-pressure reaction kettle to improve intrinsic permeability of the natural gas hydrate sediment;
a back-pressure module configured to control an exploiting rate or an exploiting pressure of the natural gas hydrate sediment;
a thermostatic water bath configured to control a temperature in the process of formation, fracturing and exploiting of the natural gas hydrate sediment; and
a data collection and processing module electrically connected to a plurality of sensing elements of the high-pressure reaction kettle, the stable-pressure gas supply module, the constant-speed constant-pressure liquid supply module, the in-situ hydraulic jet permeability enhancement module, the back-pressure module and the thermostatic water bath so as to collect and process a plurality of sensing signals of the plurality of sensing elements.

2. The in-situ hydraulic jet exploiting device of the low-permeability natural gas hydrate reservoir according to claim 1, wherein a plurality of detection layers are arranged in the high-pressure reaction kettle along a vertical direction, a plurality of temperature sensors are uniformly arranged on each of the plurality of detection layers, and the plurality of temperature sensors on a same straight line along the vertical direction is encapsulated with one stainless steel sleeve.

3. The in-situ hydraulic jet exploiting device of the low-permeability natural gas hydrate reservoir according to claim 1, wherein the stable-pressure gas supply module comprises a high-pressure gas source, a pressure reducing valve, a high-pressure gas storage cylinder, and a gas flowmeter, the high-pressure gas source is connected to an inlet of the high-pressure gas storage cylinder through the pressure reducing valve; a safety valve, a pressure sensor and a temperature sensor are mounted on the high-pressure gas storage cylinder; and an outlet of the high-pressure gas storage cylinder is connected to the high-pressure reaction kettle through the gas flowmeter.

4. The in-situ hydraulic jet exploiting device of the low-permeability natural gas hydrate reservoir according to claim 1, wherein a plurality of horizontal exploiting wells are arranged inside the high-pressure reaction kettle, one end of each of the plurality of horizontal exploiting wells is connected to the in-situ hydraulic jet permeability enhancement module, and an other end of the each of the plurality of horizontal exploiting wells is connected to the back-pressure module.

5. The in-situ hydraulic jet exploiting device of the low-permeability natural gas hydrate reservoir according to claim 4, wherein the back-pressure module comprises a hydraulic oil tank, a hand pump, a back-pressure container, a back-pressure reaction kettle, a water storage tank placed on an electronic balance, a gas-liquid separator, a gas flowmeter and an exhaust gas tank, the hydraulic oil tank is connected to a pressure control end of the back-pressure reaction kettle through the hand pump and the back-pressure container; an inlet of the back-pressure reaction kettle is connected to the plurality of horizontal exploiting wells in the high-pressure reaction kettle; an outlet of the back-pressure reaction kettle is connected to an inlet of the gas-liquid separator; a liquid outlet of the gas-liquid separator is connected to the water storage tank; and a gas outlet of the gas-liquid separator is connected to the exhaust gas tank through the gas flowmeter.

6. The in-situ hydraulic jet exploiting device of the low-permeability natural gas hydrate reservoir according to claim 4, wherein the constant-speed constant-pressure liquid supply module comprises a deionized water tank placed on an electronic balance, a constant-speed constant-pressure pump, a cooling coil and a floating piston cylinder, the deionized water tank is divided into two branches through the constant-speed constant-pressure pump, one branch of the two branches is connected to the high-pressure reaction kettle through the cooling coil and an other branch of the two branches is connected to an upper end of the floating piston cylinder.

7. The in-situ hydraulic jet exploiting device of the low-permeability natural gas hydrate reservoir according to claim 6, wherein the in-situ hydraulic jet permeability enhancement module comprises a pulping pond placed on the electronic balance, the constant-speed constant-pressure pump, a one-way valve, the floating piston cylinder and a pulse abrasive nozzle, the pulping pond is connected to a lower end of the floating piston cylinder through the constant-speed constant-pressure pump and the one-way valve; and the lower end of the floating piston cylinder is further connected to the plurality of horizontal exploiting wells in the high-pressure reaction kettle through the pulse abrasive nozzle.

8. The in-situ hydraulic jet exploiting device of the low-permeability natural gas hydrate reservoir according to claim 7, wherein the in-situ hydraulic jet permeability enhancement module further comprises an overflow valve having one end connected to a connection pipeline between the floating piston cylinder and the pulse abrasive nozzle, and an other end of the overflow valve connected to the pulping pond.

9. The in-situ hydraulic jet exploiting device of the low-permeability natural gas hydrate reservoir according to claim 7, wherein the pulse abrasive nozzle comprises an impinging wall, an upper end of the impinging wall is of a conical structure with an upper end nozzle, and a lower end nozzle is arranged at a lower end of the impinging wall; an oscillation chamber is formed between the lower end nozzle and the upper end nozzle; and after entering the oscillation chamber from the lower end nozzle, abrasive slurry generates a pulse oscillation in the oscillation chamber, and is ejected from the upper end nozzle.

10. An in-situ hydraulic jet exploiting method of a low-permeability natural gas hydrate reservoir, being implemented based on the device according to claim 1, comprising the following steps:
   step I: filling porous sediment into the high-pressure reaction kettle, placing the high-pressure reaction kettle into the thermostatic water bath after sealing, and vacuumizing the high-pressure reaction kettle;
   step II: injecting natural gas into the high-pressure reaction kettle through the stable-pressure gas supply module and injecting deionized water into the high-pressure reaction kettle through the constant-speed constant-pressure liquid supply module to form the natural gas hydrate sediment;
   step III: making abrasive slurry in a pulping pond enter a lower end of a floating piston cylinder through the constant-speed constant-pressure pump and making the deionized water enter an upper end of the floating piston cylinder through another constant-speed constant-pressure pump, and when a pressure at the upper end of the floating piston cylinder reaches set jet pressure, opening a corresponding control valve for performing the in-situ hydraulic jet permeability enhancement on the natural gas hydrate sediment through a pulse abrasive nozzle; and
   step IV, making hydraulic oil return to a back-pressure container through a hand pump to increase a pressure of the back-pressure container to the exploiting pressure, opening a corresponding control valve for the in-situ exploiting, making a exploited gas-liquid mixture enter a gas-liquid separator after an exploited gas-liquid mixture is buffered through the back-pressure reaction kettle, and recording a plurality of amounts of produced gas and liquid by the data collection and processing module in real time.

11. The in-situ hydraulic jet exploiting method according to claim 10, wherein a plurality of horizontal exploiting wells are arranged inside the high-pressure reaction kettle, one end of each of the plurality of horizontal exploiting wells is connected to the in-situ hydraulic jet permeability enhancement module, and an other end of the each of the plurality of horizontal exploiting wells is connected to the back-pressure module.

12. The in-situ hydraulic jet exploiting method according to claim 10, wherein the stable-pressure gas supply module comprises a high-pressure gas source, a pressure reducing valve, a high-pressure gas storage cylinder, and a gas flowmeter, the high-pressure gas source is connected to an inlet of the high-pressure gas storage cylinder through the pressure reducing valve; a safety valve, a pressure sensor and a temperature sensor are mounted on the high-pressure gas storage cylinder; and an outlet of the high-pressure gas storage cylinder is connected to the high-pressure reaction kettle through the gas flowmeter.

13. The in-situ hydraulic jet exploiting method according to claim 10, wherein the constant-speed constant-pressure liquid supply module comprises a deionized water tank placed on an electronic balance, a constant-speed constant-pressure pump, a cooling coil and a floating piston cylinder, the deionized water tank is divided into two branches through the constant-speed constant-pressure pump, one branch of the two branches is connected to the high-pressure reaction kettle through the cooling coil and an other branch of the two branches is connected to an upper end of the floating piston cylinder.

14. The in-situ hydraulic jet exploiting method according to claim 10, wherein the in-situ hydraulic jet permeability enhancement module comprises a pulping pond placed on the electronic balance, the constant-speed constant-pressure pump, a one-way valve, the floating piston cylinder and a pulse abrasive nozzle, the pulping pond is connected to a lower end of the floating piston cylinder through the constant-speed constant-pressure pump and the one-way valve; and the lower end of the floating piston cylinder is further connected to the plurality of horizontal exploiting wells in the high-pressure reaction kettle through the pulse abrasive nozzle.

15. The in-situ hydraulic jet exploiting method according to claim 10, wherein the in-situ hydraulic jet permeability enhancement module further comprises an overflow valve having one end connected to a connection pipeline between the floating piston cylinder and the pulse abrasive nozzle, and an other end of the overflow valve connected to the pulping pond.

16. The in-situ hydraulic jet exploiting method according to claim 10, wherein the pulse abrasive nozzle comprises an impinging wall, an upper end of the impinging wall is of a conical structure with an upper end nozzle, and a lower end nozzle is arranged at a lower end of the impinging wall; an oscillation chamber is formed between the lower end nozzle and the upper end nozzle; and after entering the oscillation chamber from the lower end nozzle, abrasive slurry generates a pulse oscillation in the oscillation chamber, and is ejected from the upper end nozzle.

17. The in-situ hydraulic jet exploiting method according to claim 10, wherein the back-pressure module comprises a hydraulic oil tank, a hand pump, a back-pressure container, a back-pressure reaction kettle, a water storage tank placed on an electronic balance, a gas-liquid separator, a gas flowmeter and an exhaust gas tank, the hydraulic oil tank is connected to a pressure control end of the back-pressure reaction kettle through the hand pump and the back-pressure container; an inlet of the back-pressure reaction kettle is connected to the plurality of horizontal exploiting wells in the high-pressure reaction kettle; an outlet of the back-pressure reaction kettle is connected to an inlet of the gas-liquid separator; a liquid outlet of the gas-liquid separator is connected to the water storage tank; and a gas outlet of the gas-liquid separator is connected to the exhaust gas tank through the gas flowmeter.

18. The in-situ hydraulic jet exploiting method according to claim 10, wherein a plurality of detection layers are arranged in the high-pressure reaction kettle along a vertical direction, a plurality of temperature sensors are uniformly arranged on each of the plurality of detection layers, and the plurality of temperature sensors on a same straight line along the vertical direction is encapsulated with one stainless steel sleeve.

* * * * *